United States Patent

Nagaoka et al.

[11] Patent Number: 5,954,960
[45] Date of Patent: Sep. 21, 1999

[54] ROTARY DRUM TYPE DEHYDRATOR

[75] Inventors: Tadayoshi Nagaoka, Tondabayashi, Japan; Arthur Leal, Houston, Tex.

[73] Assignee: Nagaoka USA Corporation, Tex.

[21] Appl. No.: 09/044,498

[22] Filed: Mar. 19, 1998

[51] Int. Cl.[6] .......................... B01D 33/073; B01D 33/06
[52] U.S. Cl. ...................... 210/402; 210/406; 210/416.1
[58] Field of Search .................... 210/402, 403, 210/404, 416.1, 406; 417/76, 79, 87, 88

[56]  References Cited

U.S. PATENT DOCUMENTS

| 3,528,551 | 9/1970 | Herubel . |
| 3,682,310 | 8/1972 | Valdespino . |
| 4,287,063 | 9/1981 | Stenzel . |
| 4,707,260 | 11/1987 | Nagayama . |
| 5,618,424 | 4/1997 | Nagaoka . |
| 5,622,625 | 4/1997 | Nagaoka . |
| 5,624,239 | 4/1997 | Osika . |

FOREIGN PATENT DOCUMENTS

| 59-36510 | 2/1984 | Japan . |
| 60-7913 | 1/1985 | Japan . |
| 63-20013 | 1/1988 | Japan . |

Primary Examiner—Thomas M. Lithgow
Attorney, Agent, or Firm—Hedman, Gibson & Costigan, P.C.

[57] ABSTRACT

A rotary drum type dehydrator includes a rotary drum filter, a suction tube having an inlet and an outlet, said inlet communicating with inside space of the rotary drum filter, a compressed air supply tube connected to the suction tube in a portion thereof downstream of the inlet and communicating with the suction tube and an air compressor connected to the compressed air supply tube for supplying compressed air to the compressed air supply tube. Vacuum is produced in the inside space of the rotary drum filter by supplying compressed air from the air compressor to the suction tube through the compressed air supply tube. A filtered liquid receiving container is provided to collect filtered liquid and the outlet of the suction tube is disposed in the filtered liquid receiving container in such a manner that filtered liquid is jetted out of the outlet of the suction tube and is struck against a side wall of the filtered liquid receiving container or against surface of liquid stored in the container.

5 Claims, 3 Drawing Sheets

ROTARY DRUM TYPE DEHYDRATOR

BACKGROUND OF THE INVENTION

This invention relates to a rotary drum type dehydrator for dehydrating sludge through a rotary drum filter.

Known in the art of dehydrators is a rotary drum type dehydrator which dehydrates sludge by means of suction force provided by vacuum which is produced in the rotary drum filter. This type of dehydrator has, as illustrated in FIG. 6, a rotary drum filter a which is partly submerged in slurry contained in a slurry tank f and has a cylindrical filter made of a suitable filter material such as a wedge wire, a receiver tank b which is connected to the rotary filter drum a and a vacuum producing pump c connected to the receiver tank b. Liquid content of the sludge is sucked into the rotary drum filter a by means of suction force produced by the vacuum pump 3 and collected in the receiver tank b and solid content in the sludge is left in the form of cake on the outer surface of the rotary drum filter a and this cake is scraped off from the outer surface of the rotary drum filter a by a scraper.

A large vacuum producing pump is required as the pump c because vacuum must be produced in the rotary drum filter a through the receiver tank b. The dehydrator requires also a large tank as the receiver tank b because the receiver tank b must have a relatively large distance between the surface of filtered liquid and an inlet of a suction hose d for preventing the vacuum producing pump c from sucking liquid particles of the filtered liquid into the pump c. The receiver tank b must also have a relatively large distance between an outlet of a suction hose e connecting the rotary drum filter a and the receiver tank b and the inlet of the suction hose d for likewise preventing the vacuum producing pump c from sucking liquid particles of the filtered liquid into the pump c. Thus, the prior art rotary drum type dehydrator as a whole requires a relatively large and bulky apparatus which requires a high manufacturing cost.

In addition to such problem in design, space and cost, there is a serious technical disadvantage in this type of prior art dehydrator.

For producing suction force in the entire peripheral surface of the rotary drum filter, connecting portions between the rotary drum filter a, suction hose e, receiver tank b, suction hose d and vacuum producing pump c are completely sealed. After start of the dehydrating operation, air is sucked into the inside of the rotary drum filter a until a layer of slurry is formed around the entire outer cylindrical surface of the rotary drum filter a and, in this state, a high vacuum is not produced in the rotary drum filter a and the receiver tank b.

Upon completion of forming of the layer of slurry around the entire outer surface of the rotary drum filter a by rotation of the rotary drum filter a, sucking of air into the inside of the rotary drum filter a is suddenly interrupted and vacuum in the rotary drum filter a, instantaneously becomes high. This sudden increase in the degree of vacuum causes rapid compression of the slurry layer formed on the outer surface of the rotary drum filter a with the result that a layer of compact cake is instantaneously formed. This causes further interruption of air sucked into the rotary drum filter a through the layer of cake and this in turn further increases the degree of vacuum in the rotary drum filter a resulting in further compression of the cake layer. Thus, liquid content of slurry newly collected upon the compact cake layer cannot be sucked into the rotary drum filter a through the compact cake layer which forms a kind of cylindrical wall around the rotary drum filter a except in a case where there occurs a crack in the compact cake layer. Besides, such compact cake tends to block slits or pores of the filter material of the rotary drum which hampers the efficiency of the dehydration work.

This is particularly so in a case where slurry to be dehydrated is one of a high viscosity such as slurry containing bentonite. In the case of slurry containing bentonite, a thin film of compact cake is formed on the outer surface of the rotary drum filter whereby forming of a cake layer outside of the initially formed cake layer is made extremely difficult and blocking of filter is caused.

For this reason, a sufficient dehydrating effect cannot be attained by the prior art rotary drum type dehydrator and, in the industry, this type of dehydrator utilizing vacuum produced in the rotary drum filter is being replaced by other types of dehydrators such as those utilizing pressing of slurry and separating liquid content from solid content by centrifugal force.

It is, therefore, desirable for the rotary drum type dehydrator utilizing vacuum to provide vacuum in the rotary drum filter of such a degree that it does not increase suddenly but increases gradually after completion of forming of a layer of slurry around the outer surface of the rotary drum filter so that the slurry layer is not suddenly compressed to an excessively compact cake but is compressed to the degree that liquid content of slurry collected subsequently on the initially formed cake layer can be sucked into the rotary drum filter through the initially formed cake layer. Alternatively stated, vacuum in the rotary drum filter must be of such a degree that, after completion of forming of a slurry layer around the entire outer surface of the rotary drum filter, the initially formed cake allows dehydration of slurry collected subsequently on the initially formed cake.

The prior art rotary drum type dehydrator requires generation of high vacuum because of the above described design using the receiver tank between the rotary drum filter and the vacuum producing pump and it is extremely difficult for this type of dehydrator to provide moderate vacuum which, after completion of forming of a slurry layer around the outer surface of the rotary drum filter, allows dehydration of slurry collected subsequently on the initially formed cake.

It is, therefore, an object of the invention to provide a rotary drum type dehydrator capable of allowing, after completion of forming of an initial cake layer around the outer surface of a rotary drum filter, dehydration of slurry collected subsequently on the initially formed cake.

It is another object of the invention to provide a rotary drum type dehydrator which is of a compact and low-cost design while attaining dehydration of slurry effectively.

SUMMARY OF THE INVENTION

For achieving the object of the invention, there is provided a rotary drum type dehydrator comprising a rotary drum filter, a suction tube having an inlet and an outlet, said inlet communicating with inside space of the rotary drum filter, a compressed air supply tube connected to the suction tube in a portion thereof downstream of the inlet and communicating with the suction tube, and an air compressor connected to the compressed air supply tube for supplying compressed air to the compressed air supply tube, vacuum being produced in the inside space of the rotary drum filter by supplying compressed air from the air compressor to the suction tube through the compressed air supply tube.

According to the invention, there is produced in the rotary drum filter moderate vacuum of such a degree that, after completion of forming of a slurry layer around the entire outer surface of the rotary drum filter, the initially formed cake allows dehydration of slurry collected subsequently on the initially formed cake.

In one aspect of the invention, a part of the suction tube having the inlet is located inside of the rotary drum filter and a part of the suction tube having the outlet is located outside of the rotary drum filter, and the compressed air supply tube is connected to the portion of the suction tube located inside of the rotary drum filter.

In another aspect of the invention, the rotary drum type dehydrator further comprises a filtered liquid receiving container having a side wall in which the outlet of the suction tube is disposed in such a manner that the filtered liquid jetted out of the outlet of the suction tube is struck against the side wall of the filtered liquid receiving container.

According to this aspect of the invention, the filtered liquid jetted out of the outlet of the suction tube is struck against the side wall of the filtered liquid receiving container and, accordingly, fine solid particles contained in the filtered liquid such as bentonite particles are converted to a form in which liquid content can be more easily separated in a subsequent secondary dehydration process.

In another aspect of the invention, a part of the suction tube having the outlet is located outside of the rotary drum filter and the compressed air supply tube is connected to the portion of the suction tube located outside of the rotary drum filter.

In another aspect of the invention the rotary drum type dehydrator further comprises a filtered liquid receiving container in which the outlet of the suction tube is disposed in such a manner that the filtered liquid jetted out of the suction tube is struck against surface of the filtered liquid stored in the filtered liquid receiving container.

According to this aspect of the invention, fine solid particles in the filtered liquid such as bentonite particles are converted to a form in which liquid content can be more easily separated in a subsequent secondary dehydration process.

In another aspect of the invention, there is provided a vacuum producing device used for a rotary drum type dehydrator, said vacuum producing device comprising a suction tube having an inlet and outlet, said inlet communicating with inside space of a rotary drum filter, a compressed air supply tube connected to the suction tube in a portion thereof downstream of the inlet and communicating with the suction tube, and an air compressor connected to the compressed air supply tube for supplying compressed air to the compressed air supply tube, vacuum being produced in the inside space of the rotary drum filter by supplying compressed air from the air compressor to the suction tube through the compressed air supply tube.

In still another aspect of the invention, there is provided a vacuum producing device comprising a suction tube having an inlet and outlet, a compressed air supply tube connected to the suction tube in a portion thereof downstream of the inlet and communicating with the suction tube, and an air compressor connected to the compressed air supply tube for supplying compressed air to the compressed air supply tube, vacuum being produced in inside space of a container in which the vacuum producing device is provided by supplying compressed air from the air compressor to the suction tube through the compressed air supply tube.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
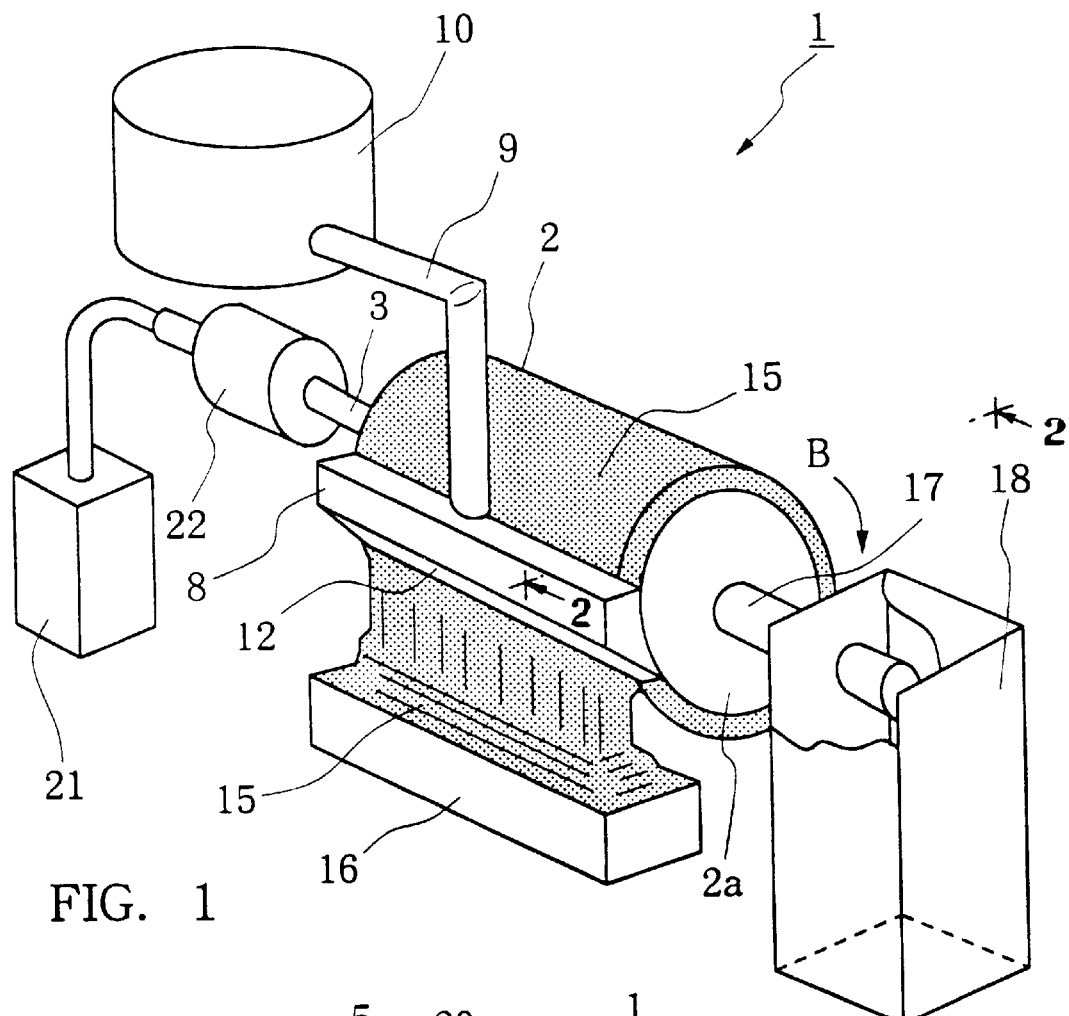
FIG. 1 is a perspective view showing an embodiment of the invention.
Figure 2:
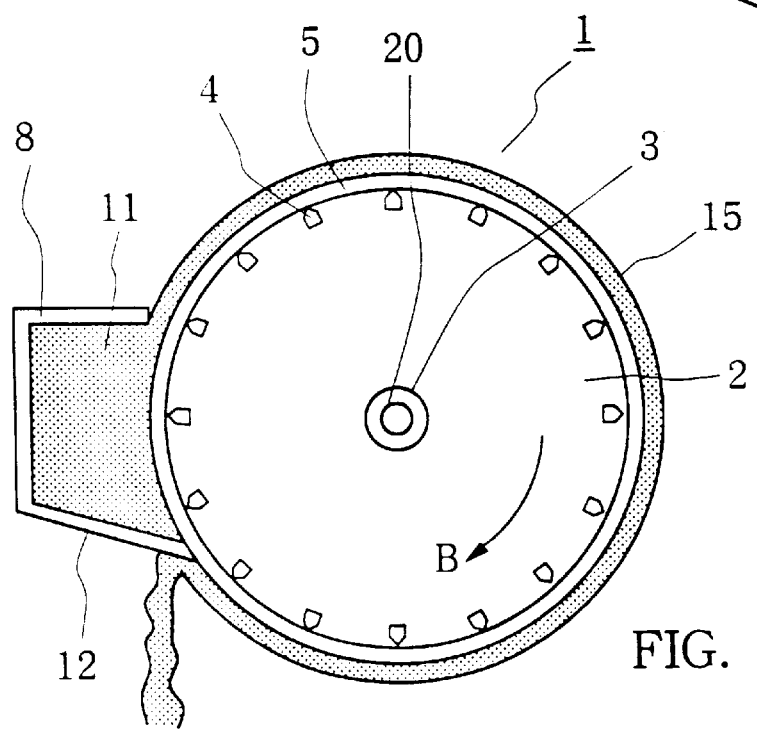
FIG. 2 is a sectional view taken along arrows A—A in FIG. 1.
Figure 3:
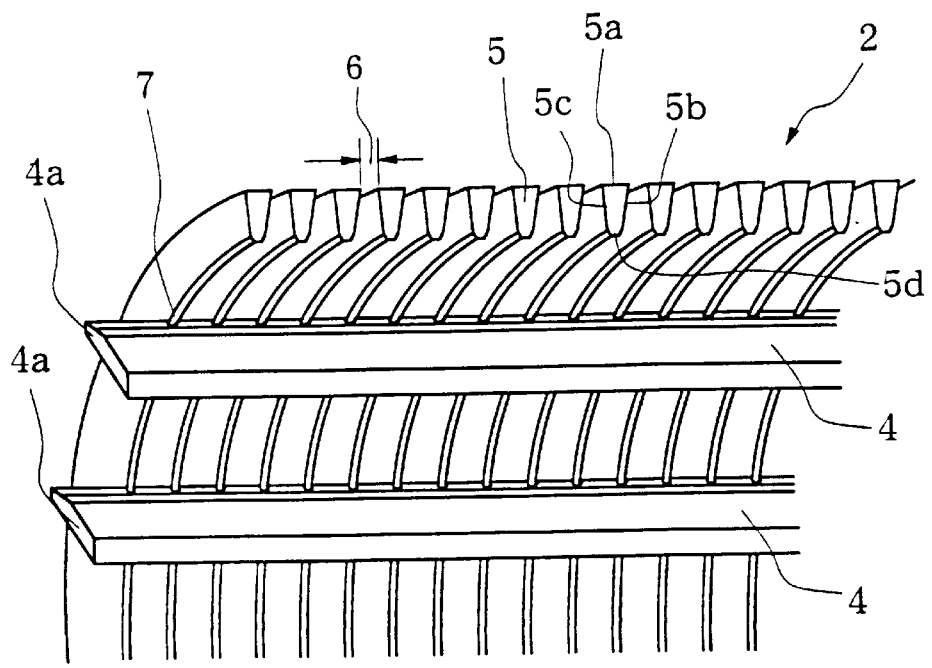
FIG. 3 is a perspective view showing a part of a filter portion of the rotary drum filter in an enlarged scale.

Referring to FIGS. 1 to 4, an embodiment of the invention will be described.

A rotary drum type dehydrator 1 for separating solid particles from a liquid has a rotary drum filter 2 fixed to a rotary shaft 3. The rotary shaft 3 is connected to a drive mechanism 22 of a known construction including an electric motor and a reduction gear system which can drive and rotate the rotary drum filter 2. The rotary drum filter 2 has, as will be clear from FIG. 3, support rods 4 extending in the axial direction of the rotary drum filter 2 and arranged generally cylindrically with a predetermined interval and having a projecting portion 4a in a radially outward end portion and a wedge wire 5 wound spirally on the outer periphery of the support rods 4 in substantially crossing direction to the support rods 4. The wedge wire 5 is arranged with its one side 5a facing outside and two other sides 5b and 5c forming a slit 6 which widens radially inwardly between adjacent wedge wire portions and with an inward apex 5d of said wedge wire 5 being welded to the projecting portions 4a of the support rods 4 at crossing points 7 of the wedge wire 5 and the support rods 4. The ends of the rotary drum filter 2 are closed by seal plates 2a.

A box type container 8 for temporarily storing a liquid 11 to be treated having a high water content rate such as sludge and supplying this liquid to the rotary drum filter 2 is provided outside of the rotary drum filter 2, extending in parallel to the rotary drum filter 2. The container 8 communicates with a tank 10 storing the liquid 11 to be treated via a tube 9 and receives the liquid 11 from the tank 10. The container 8 has an opening on the side facing the rotary drum filter 2 so that the liquid 11 will be deposited on the outer periphery of the screen drum 2 and carried out of the container 8 as the rotary drum filter 2 is rotated. In the present embodiment, a bottom plate 12 of the container 8 has an inclined opening end which is in contact with the outer periphery of the rotary drum filter 2. This inclined opening end functions as a scraper for stripping off cake 15 deposited on the periphery of the rotary drum filter 2. There is provided a cake collection box 16 under the rotary drum filter 2.

The width of the slit 6 of the wedge wire 5 of the rotary drum filter 2 is set at assumable value within a range between 1 micron and 150 microns having regard to the type and nature of the liquid to be treated, the purpose of treatment etc.

A mechanism for producing vacuum and therefore suction force in the inside of the rotary drum filter 2 will be described. A suction tube 17 which is fixed in one end portion thereof to a filtered liquid receiving container 18 extends in the inside space of the rotary drum filter 2 coaxially with the rotary drum filter 2. The suction tube 17 is bent vertically downwardly in the central portion of the rotary drum filter 2 and has an inlet 17a opening downwardly. A bearing 19 is provided between the suction tube 17 and the rotary drum filter 2 and the rotary drum filter 2 is rotated around the stationary suction tube 17 via the bearing 19. The suction tube 17 has an outlet 17b which opens in a direction normal to the vertical side wall 18a of the filtered liquid receiving container 18 in such a manner that the filtered liquid jetted out of the suction tube 17 is struck against the side wall 18a of the filtered liquid receiving container 18. Thus, a part of the suction tube 17 having the inlet 17a is located inside of the rotary drum filter 2 and a part of the suction tube 17 having the outlet 17b is located outside of the rotary drum filter 2.

A compressed air supply tube 20 which is of a smaller inner diameter than the inner diameter of the suction tube 17 is connected to the suction tube 17 in a portion of the suction tube 17 downstream of the inlet 17a and communicates with the suction tube 17. In the present embodiment, the compressed air supply tube 20 is connected to the portion of the suction tube 17 located inside of the rotary drum filter 2.

An air compressor 21 is connected to the compressed air supply tube 20 for supplying compressed air to the compressed air supply tube 20 and hence to the suction tube 17.

The filtered liquid receiving container 18 is of a box-like configuration having a rectangular cross section and vertical side walls 18a. The container 18 has a mist eliminator 23 for eliminating mist of fine particles of the filtered liquid.

The operation of the dehydrator 1 will now be described.

The liquid 15 to be treated such as sludge is supplied from the tank 10 to the container 8 and the rotary drum filter 2 is rotated in the direction of arrow B. Simultaneously, the air compressor 21 is operated to supply compressed air to the suction tube 17 through the compressed air supply tube 20 and an air jet stream thereby is generated through the compressed air supply tube 20 and the suction tube 17. This air jet stream causes a negative pressure at the inlet 17a of the suction tube 17 and pressure in the rotary drum filter 2 thereby is reduced below the atmospheric pressure. Due to this negative pressure in the rotary drum filter 2, the liquid content of the slurry deposited on the outer peripheral surface of the rotary drum filter 2 is sucked into the inside of the rotary drum filter 2 through the slots 6 of the wedge wire 5 and further into the suction tube 17. The liquid content thus sucked into the suction tube 17 is delivered to the outlet 17b of the suction tube 17 in the form of a jet stream of air and liquid and is jetted out of the outlet 17b to be struck against the side wall 18a of the filtered liquid receiving container 18.

In the meanwhile, sludge is deposited around the entire outer peripheral surface of the rotary drum filter 2 as the rotary drum filter 2 is rotated. Owing to the vacuum producing mechanism of the above described structure, the vacuum produced initially in the inside of the rotary drum filter 2 upon completion of forming of a layer of slurry around the outer surface of the rotary drum filter 2 is of such a degree that the slurry layer is not suddenly compressed to an excessively compact cake layer as in the prior art dehydrator but is compressed to the degree that liquid content of slurry collected subsequently on the initially formed cake layer can be sucked into the rotary drum filter 2 through the cake layer. Thus, new layer of slurry is successively deposited on the initially deposited cake layer and liquid content of the new sludge layer is sufficiently sucked into the suction tube 17 and delivered to the filtered liquid receiving container 18. Thus, a moderately dehydrated cake layer of suitable thickness is formed on the outer surface of the rotary drum filter 2 and the formed cake 15 comes into abutting contact with the bottom plate 12 of the container 8 which functions as a scraper and is stripped off the outer surface of the rotary drum filter 2. The cake 15 thus stripped off the rotary drum filter 2 falls into the cake collection box 16 and accumulated therein and then is taken outside. The above described operation is repeated and the liquid 11, i.e., slurry, is continuously collected from the rotary filter drum 2 as the cake 15 of a low liquid content rate.

When pressure of the compressed air becomes excessively large, there occurs cavitation in the vicinity of the outlet of the compressed air supply tube 20, i.e., in the vicinity of the connecting portion of the tube 20 with the suction tube 17 and an excessively large pressure is thereby reduced, so that no excessively high vacuum is produced in the rotary drum filter 2. Moreover, since the outlet 17b is open to atmosphere in the filtered liquid receiving container 18, if pressure of the jet stream becomes excessive in the suction tube 17, intake of air from the outlet 17b of the suction tube 17 will occur and this intake of air will reduce the pressure of the jet stream whereby occurrence of excessively high vacuum will be prevented.

In a case where the liquid to be treated is of high viscosity such as slurry containing bentonite which takes place after digging of an oil well, separation of solid content from liquid content is usually extremely difficult. The present invention is applicable to treating such highly viscous slurry in the following manner.

Such highly viscous slurry can be properly treated by a primary processing and a secondary processing.

In the primary processing, a rotary drum filter 2 of a relatively large slit width is used so that liquid containing fine particles of solid content, e.g., bentonite, will pass through the slits of the rotary drum filter 2. In this case, solid content which is deposited as cake on the outer surface of the rotary drum filter 2 is slime (i.e., sand etc.) of a relatively large diameter.

The liquid content containing bentonite which is sucked into the suction tube 17 is converted to mist by the air jet stream running in the suction tube 17 and is jetted out of the outlet 17b of the suction tube 17 and is struck against the inside surface of the side wall 18a of the filtered liquid receiving container 18. By conversion of the liquid content containing bentonite to the mist through the suction tube 17 by the air jet stream, the liquid content becomes easily separable from th bentonite content. Further, by collision of the liquid content containing bentonite against the inside surface of the side wall 18a, liquid content becomes even more easily separable from the bentonite content.

The liquid content containing bentonite is then transferred to another rotary drum type dehydrator in the secondary processing which has a smaller slit width than the dehydrator used in the primary processing. The width of the slit is so selected that the fine particles of bentonite can be deposited on the outer surface of the rotary drum filter 2 and only the liquid content which does not contain bentonite can pass through the slits. Thus, the liquid content is easily separated into solid particles and pure liquid content and a cake layer of bentonite and other fine solid particles is formed on the outer surface of the rotary drum filter whereas a fairly pure and clear liquid content is filtered through the rotary drum filter 2.

Figure 4:
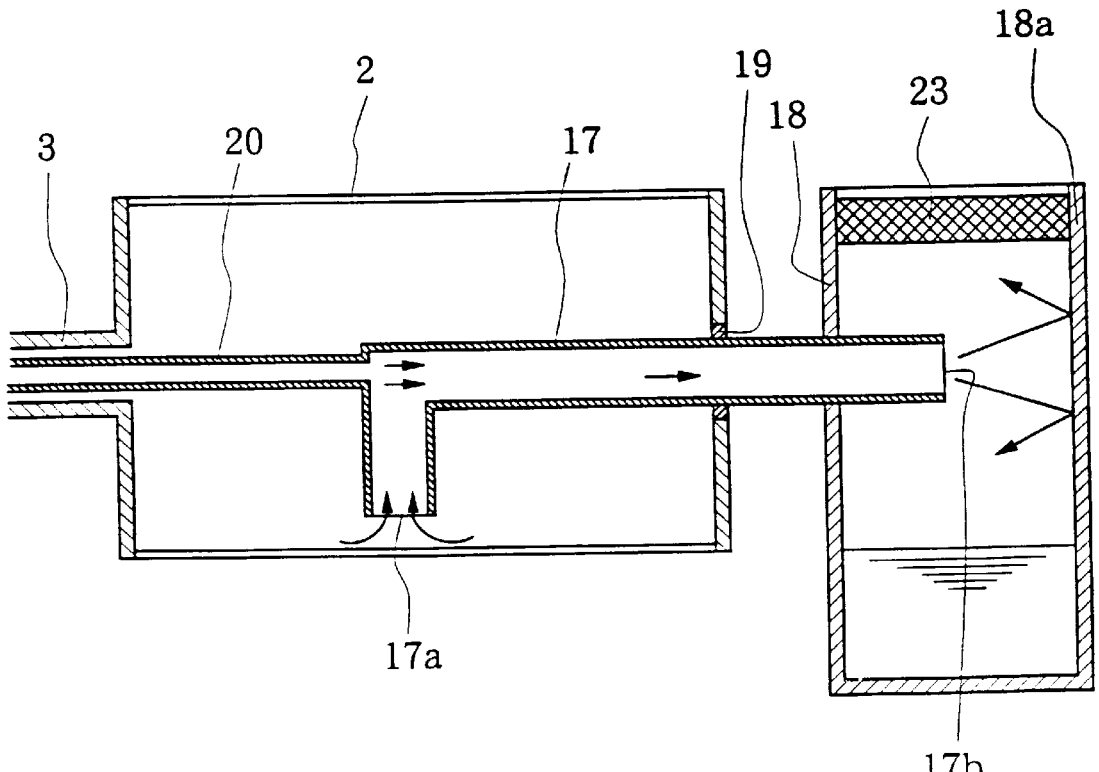
FIG. 4 is a schematic sectional view of a suction force producing portion in the embodiment of FIG. 1.
Figure 5:
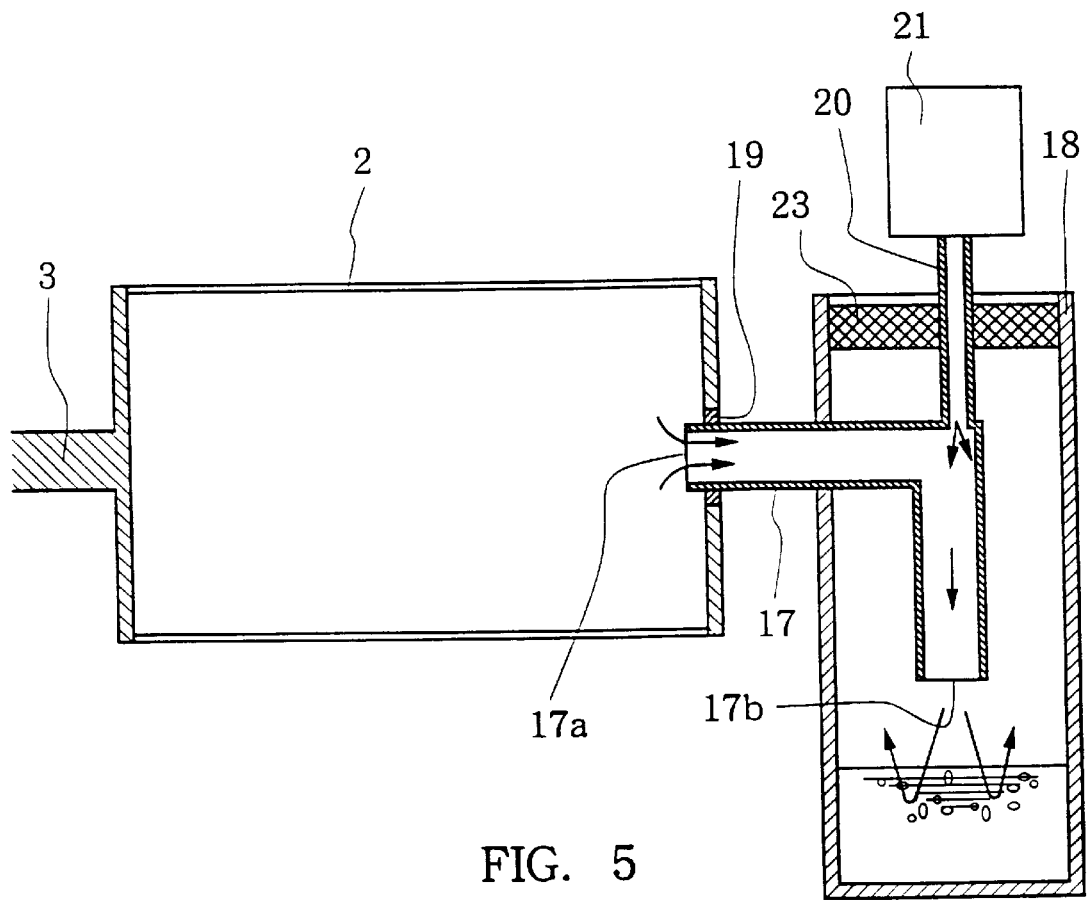
FIG. 5 is a schematic sectional view showing another embodiment of the invention.
Figure 6:
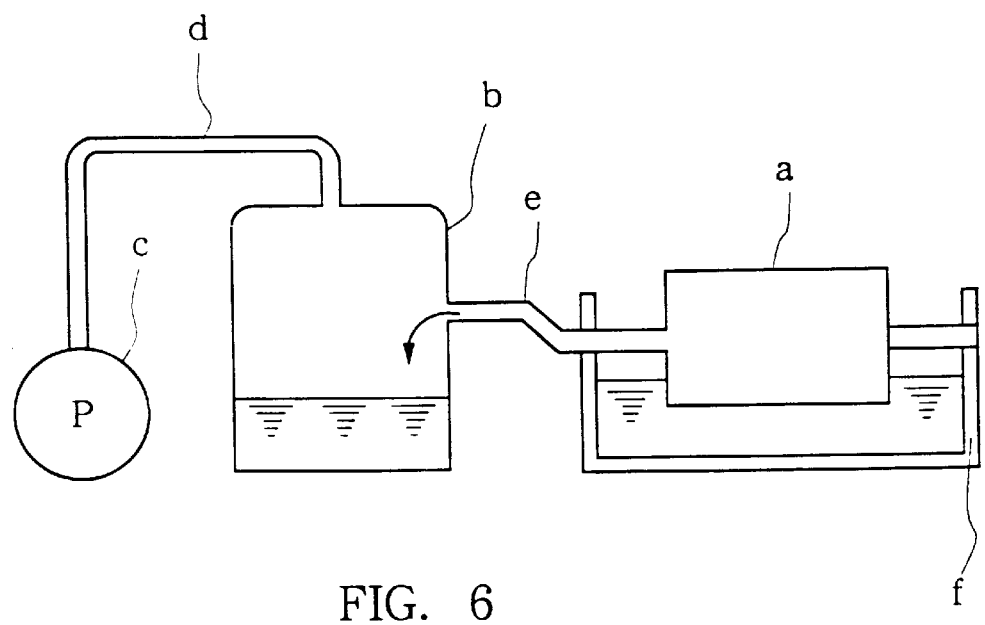
FIG. 6 is a schematic view showing a prior art rotary drum type filter.

FIG. 5 illustrates a vacuum producing mechanism of another embodiment of the invention. In this embodiment, the same component parts as those in FIG. 4 are designated by the same reference characters and description thereof will be omitted.

In the embodiment of FIG. 5, a part of a suction tube 17 having an outlet 17b is located outside of a rotary drum filter 2 and a compressed air supply tube 20 is connected to the portion of the suction tube 17 located outside of the rotary drum filter 2. The suction tube 17 has an inlet 17a which is located in an end portion of the inside space of the rotary drum filter 2 and opens to the inside space of the rotary drum filter 2. The suction tube 17 extends horizontally and then is bent vertically downwardly in a filtered liquid receiving container 18. The suction tube 17 has an outlet 17b which is disposed in such a manner that the filtered liquid jetted out of the suction tube 17 is struck against surface of the filtered liquid stored in the filtered liquid receiving container 18.

In this embodiment, filtered liquid which is sucked into the suction tube 17 is converted to mist by the air jet stream caused by supply of compressed air from an air compressor 21 and fine solid particles in the liquid thereby become easily separable from liquid content. Further, this mist is struck against the surface of the liquid stored in the filtered liquid receiving container 18 and the air jet stream forces air into the liquid and thereby agitates the liquid stored in the container 18 before this air escapes from the liquid in the form of bubbles. By this action of struck mist and agitation of the liquid by the air stream, the fine solid particles such as bentonite become more easily separable and can be separated easily from liquid content in a secondary dehydrating processing as described above.

In these embodiments, the inner diameters of the suction tube 17 and the compressed air supply tube 20, pressure of the compressed air, the diameter of the rotary drum filter 2, the distance between the outlet 17b of the suction tube 17 and the inside surface of the side wall 18a of the filtered liquid receiving container 18 etc. may be determined in accordance with the type and viscosity of liquid to be treated.

What is claimed is:

1. A rotary drum dehydrator comprising a rotary drum filter provided with a liquid dehydrating slurry or the like liquid to be treated on the outer peripheral surface of the rotary drum filter by sucking the liquid content of the slurry or like liquid to be treated into an inside space of the rotary drum filter by means of suction force provided by a vacuum produced inside of the rotary drum filter, said rotary drum type dehydrator further comprising;

a suction tube having an inlet and an outlet, said inlet communicating with inside space of the rotary drum filter;

a filtered liquid receiving container in which the outlet of said suction tube is disposed;

a compressed air supply tube connected to the suction tube in a portion thereof downstream of the inlet and communicating with the suction tube; and an air compressor connected the compressed air supply tube for supplying compressed air to the compressed air supply tube, vacuum being produced in the inside space of the rotary drum filter by supplying compressed air from the compressor to the suction tube through the compressed air supply tube whereby the liquid of said liquid dehydrating slurry being thereby sucked into the suction tube and collected in the filtered liquid receiving container.

2. A rotary drum dehydrator as defined in claim 1 wherein a part of the suction tube having the inlet is located inside of the rotary drum filter and a part of the suction tube having the outlet is located outside of the rotary drum filter, and the compressed air supply tube is connected to the portion of the suction tube located inside of the rotary drum filter.

3. A rotary drum dehydrator as defined in claim 2 wherein said filtered liquid receiving container has a side wall and the outlet of the suction tube is disposed in said filtered liquid receiving container in such a manner that the filtered liquid jetted out of the outlet of the suction tube is struck against the side wall of the filtered liquid receiving container.

4. A rotary drum dehydrator as defined in claim 1 wherein a part of the suction tube having the outlet is located outside of the rotary drum filter and the compressed air supply tube is connected to the portion of the suction tube located outside of the rotary drum filter.

5. A rotary drum dehydrator as defined in claim 4 wherein the outlet of the suction tube is disposed in said filtered liquid receiving container in such a manner that the filtered liquid jetted out of the suction tube is struck against the surface of the filtered liquid stored in the filtered liquid receiving container.

* * * * *